United States Patent
Patrikalakis et al.

(10) Patent No.: US 10,311,726 B2
(45) Date of Patent: Jun. 4, 2019

(54) SYSTEMS AND METHODS FOR A PARALLEL AUTONOMY INTERFACE

(71) Applicant: Toyota Research Institute, Inc., Los Altos, CA (US)

(72) Inventors: Andrew Patrikalakis, Los Altos, CA (US); Philipp Michel, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/656,422

(22) Filed: Jul. 21, 2017

(65) Prior Publication Data

US 2019/0027033 A1    Jan. 24, 2019

(51) Int. Cl.
| | | |
|---|---|---|
| *G08G 1/0962* | (2006.01) | |
| *G06F 3/16* | (2006.01) | |
| *B60R 1/00* | (2006.01) | |
| *G06F 3/14* | (2006.01) | |

(52) U.S. Cl.
CPC .......... *G08G 1/09626* (2013.01); *B60R 1/00* (2013.01); *G06F 3/165* (2013.01); *B60R 2300/207* (2013.01); *B60R 2300/8093* (2013.01); *G06F 3/1423* (2013.01)

(58) Field of Classification Search
None
See application file for complete search history.

(56) References Cited

U.S. PATENT DOCUMENTS

| | | | |
|---|---|---|---|
| 6,836,719 B2 | 12/2004 | Andersson et al. | |
| 8,660,734 B2 | 2/2014 | Zhu et al. | |
| 8,676,431 B1 | 3/2014 | Mariet et al. | |
| 8,823,530 B2 | 9/2014 | Green et al. | |
| 9,008,961 B2 | 4/2015 | Nemec et al. | |
| 9,177,427 B1* | 11/2015 | Briggs | G07C 5/00 |
| 9,187,099 B2 | 11/2015 | Powers et al. | |
| 9,205,835 B2 | 12/2015 | Stein et al. | |
| 9,242,647 B2 | 1/2016 | Tsimhoni et al. | |
| 9,280,202 B2 | 3/2016 | Gieseke et al. | |
| 2002/0011925 A1* | 1/2002 | Hahn | B60K 35/00 340/425.5 |
| 2003/0112132 A1* | 6/2003 | Trajkovic | B60K 35/00 340/435 |
| 2009/0009309 A1* | 1/2009 | Matsuoka | B60W 40/09 340/439 |

(Continued)

FOREIGN PATENT DOCUMENTS

JP        2013156927 A  *  8/2013  .............. G08G 1/166

*Primary Examiner* — Chico A Foxx

(74) *Attorney, Agent, or Firm* — Oblon, McClelland, Maier & Neustadt, L.L.P.

(57) ABSTRACT

A parallel autonomy interface system can include processing circuitry communicably coupling one or more sensors of an autonomous vehicle and one or more displays of the autonomous vehicle. The processing circuitry can be configured to receive output from the one or more sensors, determine if potential danger with respect to vehicle operation is detected based on the output of the one or more sensors, activate an alert in response to detecting the potential danger, the alert corresponding to avatar motion, and enable the avatar to indicate a direction of the potential danger in response to activation of the alert.

17 Claims, 7 Drawing Sheets

(56) References Cited

U.S. PATENT DOCUMENTS

| | | | |
|---|---|---|---|
| 2011/0221610 A1* | 9/2011 | Abreu | G08G 1/0965 340/902 |
| 2011/0298808 A1* | 12/2011 | Rovik | B60K 35/00 345/473 |
| 2012/0146809 A1* | 6/2012 | Oh | G07C 5/085 340/901 |
| 2014/0268353 A1 | 9/2014 | Fujimura et al. | |
| 2014/0278246 A1* | 9/2014 | Clark | F17D 5/00 702/182 |
| 2014/0362195 A1 | 12/2014 | Ng-Thow-Hing et al. | |
| 2015/0178998 A1 | 6/2015 | Attard et al. | |
| 2015/0179069 A1* | 6/2015 | Cazanas | G08G 1/096775 340/905 |
| 2015/0254986 A1 | 9/2015 | Fairfield et al. | |
| 2016/0003636 A1 | 1/2016 | Ng-Thow-Hing et al. | |
| 2016/0016663 A1 | 1/2016 | Stanek et al. | |
| 2016/0176408 A1 | 6/2016 | Lynch | |
| 2017/0166131 A1* | 6/2017 | Oba | B60R 1/002 |
| 2017/0187963 A1* | 6/2017 | Lee | G06F 3/013 |
| 2017/0309257 A1* | 10/2017 | Akita | G09G 5/38 |

* cited by examiner

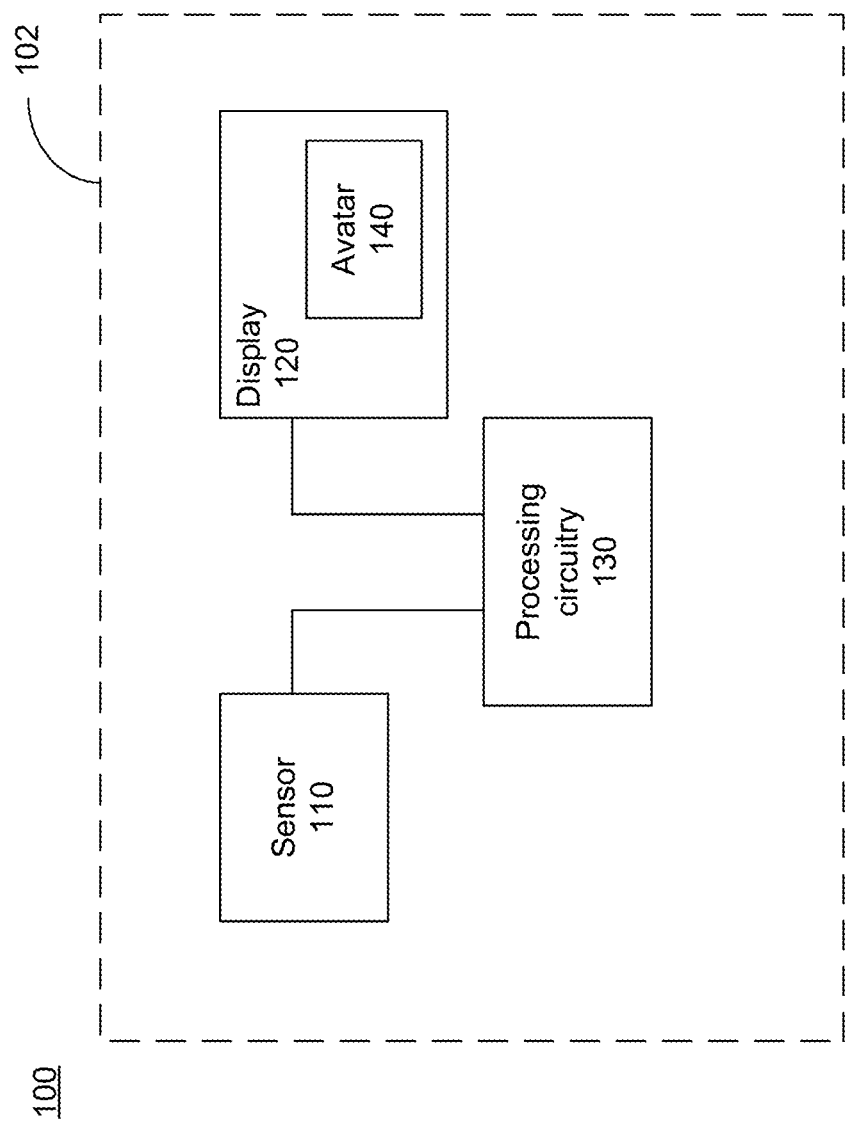

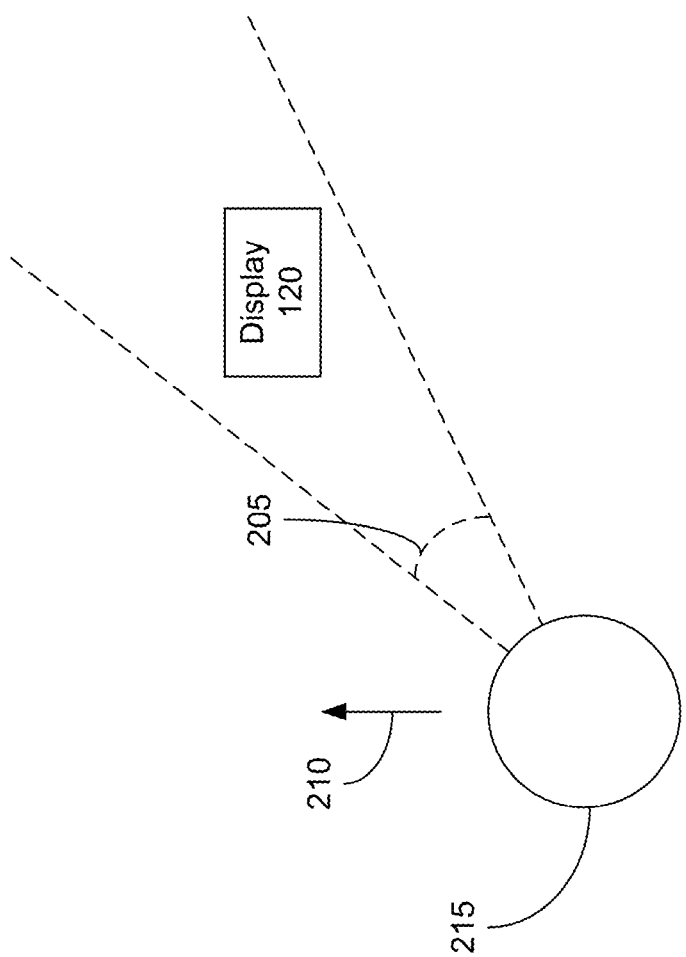

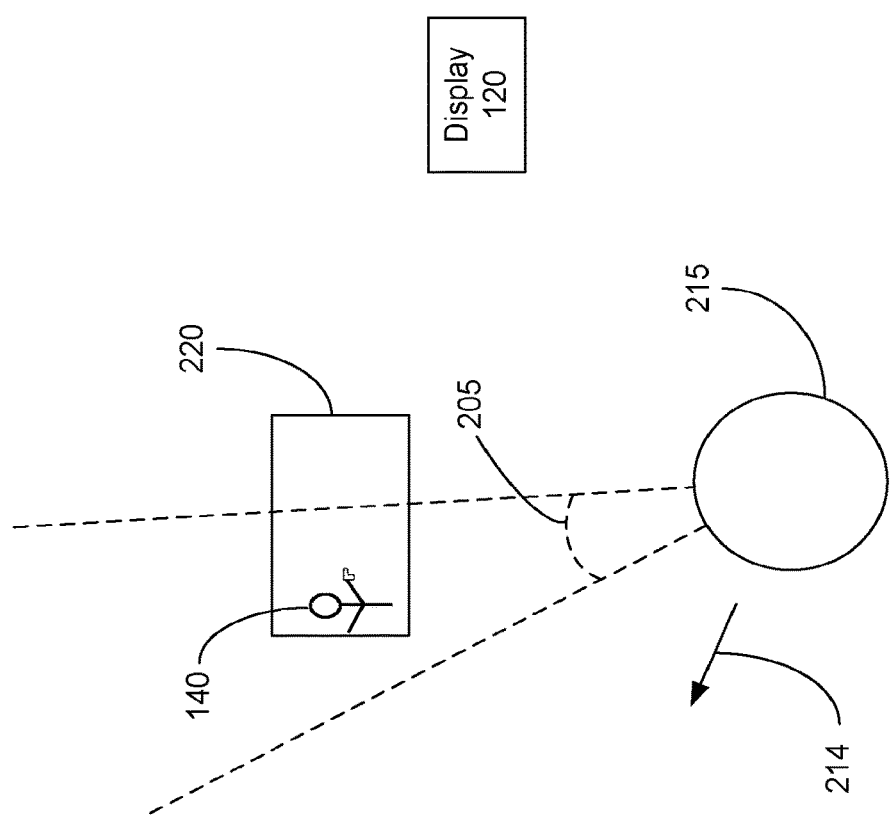

SYSTEMS AND METHODS FOR A PARALLEL AUTONOMY INTERFACE

BACKGROUND

In current autonomous vehicles, a plurality of sensors equipped with the autonomous vehicle may take measurements to gather information corresponding to the environment through which the autonomous vehicle is navigating in order to safely autonomously operate the autonomous vehicle. However, when an operator wishes to operate a vehicle with autonomous capability in a manual mode, the operator may be provided little to no information regarding the vehicle's surroundings.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one or more aspects of the disclosed subject matter, a parallel autonomy interface system can include processing circuitry communicably coupling one or more sensors of an autonomous vehicle and one or more displays of the autonomous vehicle. The processing circuitry can be configured to receive output from the one or more sensors, determine if potential danger with respect to vehicle operation is detected based on the output of the one or more sensors, activate an alert in response to detecting the potential danger, the alert corresponding to avatar motion, and enable the avatar to indicate a direction of the potential danger in response to activation of the alert.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a block diagram of a vehicle display system according to one or more embodiments of the disclosed subject matter;

FIG. 2A depicts an aerial view of an operator of a vehicle with a first focal point according to one or more aspects of the disclose subject matter;

FIG. 2C depicts an aerial view of operator of a vehicle with a third focal point according to one or more aspects of the disclosed subject matter;

DETAILED DESCRIPTION

Figure 2B:
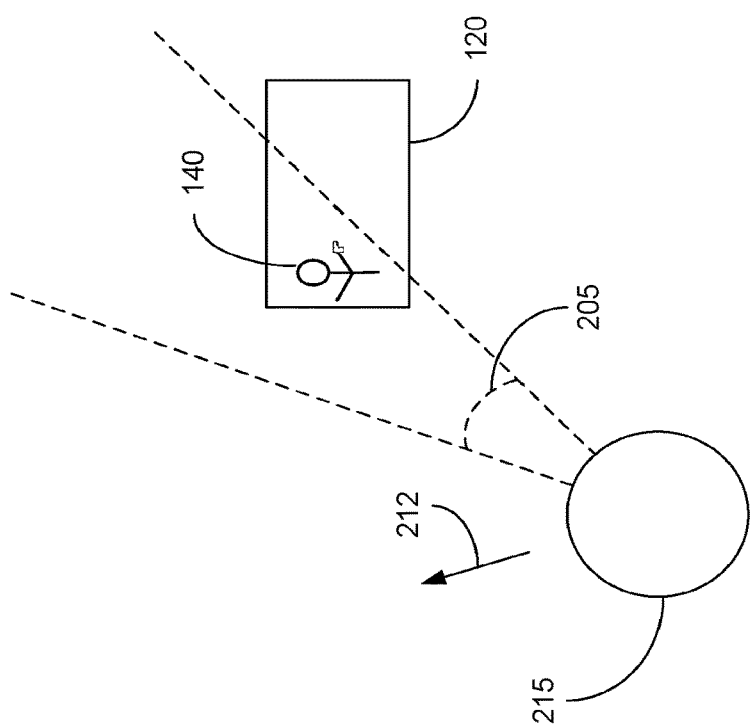
FIG. 2B depicts an aerial view of operator of a vehicle with a second focal point according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "side," "height," "length," "width," "upper," "lower," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

In an autonomous vehicle, whether or not the vehicle is being driven autonomously, the autonomous vehicle can be continuously aware of the environment through which the autonomous vehicle is navigating via a plurality of sensors equipped with the autonomous vehicle. Because this information is already available in the vehicle, the continuous stream of information may be beneficial to an operator of the autonomous vehicle when operating the autonomous vehicle in a manual mode. For example, the information, provided by the plurality of sensors, can be displayed in the form of an avatar. If a dangerous situation arises in the environment of the autonomous vehicle, the avatar can indicate the direction of the potential danger. The avatar thus provides the driver an opportunity to avoid and/or respond to the dangerous situation. The avatar can incorporate motion in its display and make use of the fact that an operator (e.g., human) may respond well to fast motion and optical flow, especially in the peripheral vision of the operator. Therefore, the avatar can also be strategically placed in the peripheral view of the operator because humans tend to respond well to motion in their periphery.

FIG. 1 is a block diagram of a vehicle display system 100 (herein referred to as the system 100) according to one or more embodiments of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can comprise a sensor 110, a display 120, processing circuitry 130 (which can include internal and/or external memory), and an avatar 140. In one or more embodiments, the sensor 110, the display 120, the processing circuitry 130, and the avatar 140 can be implemented in apparatus 102, such as a vehicle, for instance, wherein the vehicle can be a vehicle capable of autonomous operation. Further, the aforementioned components can be electrically connected or in electrical or electronic communication with each other as diagrammatically represented by FIG. 1, for example.

Generally speaking, system 100 can cause or allow an avatar 140 to be displayed via a display 120. The avatar 140 can be displayed in a predetermined location while assisting an operator of the vehicle 102. For example, the avatar 140 can be configured to alert the operator of a potential dangerous situation.

More specifically, the predetermined location of the avatar 140 can be based on the peripheral vision of the operator of the vehicle 102. For example, the avatar 140 can be positioned in a predetermined range of the operator's peripheral vision. The predetermined range of the operator's peripheral vision can be a mid-peripheral range corresponding to 30 to 60 degrees from a focal point of the operator. The avatar 140 can assist the operator of the vehicle 102 in anticipating potentially dangerous situations. The avatar 140 can alert the operator via sound and/or motion. For example, the avatar 140 may make one or more predetermined movements to get the attention of the operator of the vehicle 102. After gaining the attention of the operator, the avatar 140 can indicate the direction of potential danger. As a result, the operator of the vehicle 102 can adjust their focal point and/or increase their focus in the direction of the potential danger.

The sensor 110 can represent one or more sensors 110. The one or more sensors 110 can include various sensors to operate an autonomous vehicle as would be known by one of ordinary skill in the art. The types of sensors 110 can include a LIDAR sensor, a Radar sensor, a laser scanner, at least one camera, a GPS antenna, Sonar, and the like. The output from the one or more sensors 110 can be utilized to display the avatar 140 in a predetermined location. Additionally, the output from the one or more sensors 110 can be utilized determine a direction of a potential danger and cause the avatar 140 to indicate the direction of the potential danger. For example, the output from the one or more sensors 110 can continue to evaluate the environment of the vehicle 102 as if the vehicle 102 was operating autonomously. However, when the vehicle 102 is not being operated autonomously, the information can still be utilized to improve safety. As a result, the one or more sensors 110 can identify a potential danger (e.g., a vehicle braking aggressively) and assist the operator of the vehicle 102 in avoiding and/or responding to the potential danger via the avatar 140 by causing the avatar 140 to indicate a direction of the potential danger.

It should be appreciated that any sensor can be included in the plurality of sensors 110 such that the sensor may improve the safety and/or the precision with which an autonomous vehicle operates as would be known by one or ordinary skill in the art. Additionally, the output received from the additional sensors could be utilized in the system 100.

The processing circuitry 130 can carry out instructions to perform or cause performance of various functions, operations, steps or processes of the system 100. The processor/processing circuitry 130 can be configured to store information in memory, receive output from the one or more sensors 110, operate the system 100, display the avatar 140, and the like.

The display 120 can represent one or more displays of the system 100. The displays 120 can be one or more of a Heads-Up Display (HUD), a hologram projection system, a liquid crystal display (LCD), a light emitting diode (LED) display, and the like. The one or more displays 120 can display the avatar 140, as well as displaying the avatar 140 indicating a direction of potential danger as determined by the one or more sensors 110.

FIG. 2A depicts an aerial view of an operator 215 of the vehicle 102 with a first focal point 210 according to one or more aspects of the disclose subject matter. The operator 215 can have a first focal point 210 corresponding to a direction that the operator of the vehicle 102 is looking. Area 205 can correspond to a predetermined range of peripheral vision. For example, the area 205 can correspond to a range of 30 to 60 degrees relative to the focal point (e.g., first focal point 210). The display 120 can be placed in a predetermined location. The predetermined location can correspond to the area 205. The display 110 can be placed in the area 205 to gain a benefit corresponding to peripheral vision. For example, motion detection is increased in the peripheral vision of the operator 215. By maintaining the display 120 in the area 205, the operator 215 can have improved sensitivity to motion in the area 205, thereby allowing the avatar 140 to more robustly gain the attention of the operator 215 when a potential danger has been identified. The avatar 140 can be displayed in any portion of the display 140 provided that the avatar 140 remains in the area 205.

It should be appreciated that peripheral vision can include a vertical range. Therefore, as further described herein, any location in which the avatar 140 is displayed may be within a predetermined range of vertical peripheral vision. For example, the predetermined range of vertical peripheral vision may include 60 degrees superior (up) relative to the focal point and 60 degrees nasal (towards the nose) relative to the focal point.

FIG. 2B depicts an aerial view of operator 215 of the vehicle 102 with a second focal point 212 according to one or more aspects of the disclosed subject matter. In one aspect, the operator 215 may shift focal points while operating the vehicle 102 (e.g., check mirrors, read signs, get distracted by objects/events outside the vehicle 102, etc.). In other words, the operator 215 may frequently look around while operating the vehicle 102, thereby frequently changing the focal point. For example, the focal point may shift from the first focal point 210 in FIG. 2A to the second focal point 212 in FIG. 2B.

As a result of the focal point shift, the area 205 also shifts. As illustrated in FIG. 2B, the entire display 120 may not be included in area 205. In one aspect, when at least a portion of display 120 is not within the area 205, the avatar 140 may adjust to be displayed in a portion of the display 120 that has remained in the area 205 after the focal point shift. In one particular example, the second focal point 212 may cause the area 205 to only capture a predetermined portion of the display 120. In response to the focal point shift from the first focal point 210 to the second focal point 212, the system 100 can automatically display the avatar 140 in a top left corner of the display 120, for example.

FIG. 2C depicts an aerial view of the operator 215 of the vehicle 102 with a third focal point 214 according to one or more aspects of the disclosed subject matter. In one aspect, the focal point 214 may shift to a point where the area 205 does not include the display 120 (e.g., operator 215 is looking out the driver side window). However, area 205 may have shifted such that the area 205 includes a second display 220 (e.g., a heads up display (HUD)). The one or more displays 120, 220 can work together to provide more display area for the avatar 140. In response to the focal point shifting to the third focal point 214, thereby shifting the area 205 such that the display 120 is not within the area 205, the system 100 may automatically display the avatar 140 via the HUD 220 so the avatar 140 may remain in the area 205. Additionally, the entirety of the HUD 220 may not be in the area 205. As a result, the system 100 can automatically display the avatar 140 via the HUD 220 in a portion of the HUD 220 that is within the area 205.

Figure 3:
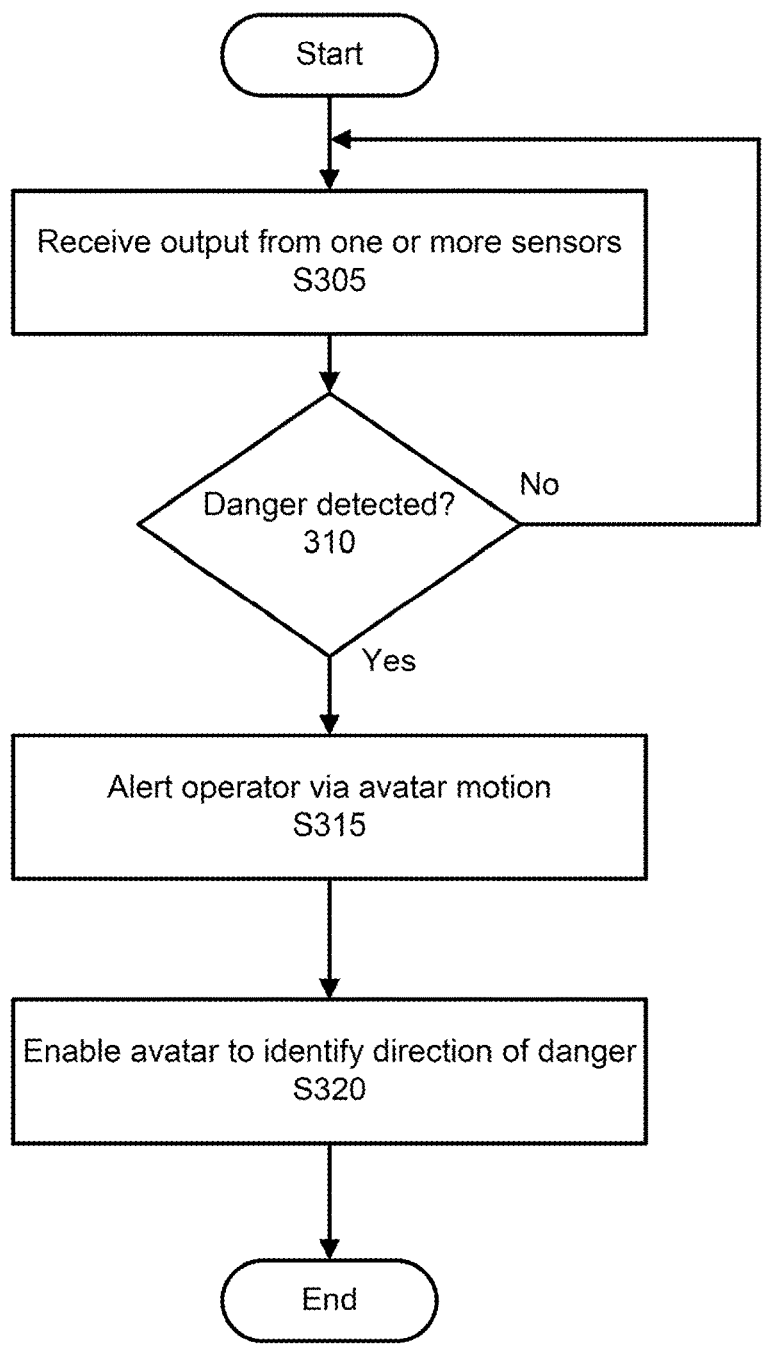
FIG. 3 is an algorithmic flow chart of a method for adjusting an avatar to identify a potential danger according to one or more aspects of the disclosed subject matter.

FIG. 3 is an algorithmic flow chart of a method for adjusting the avatar 140 to identify a potential danger according to one or more aspects of the disclosed subject matter.

In S305, output from one or more of the sensors 110 can be received. The one or more sensors 110 can operate as if the one or more sensors 110 are configured to gather information utilized for autonomous vehicle operation. As a result, the output from the one or more sensors 110 can be utilized for identifying any potential danger in the environment surrounding the vehicle 102.

In S310, it can be determined if any potential danger is detected by the one or more sensors 110. If there is no potential danger detected by the one or more sensors 110, the process can return to S305 to continue receiving output from the one or more sensors 110. However, if a potential danger is detected, an operator 215 can be alerted via motion of the avatar 140.

In S315, the operator 215 may be alerted via motion of the avatar 140. For example, the avatar 140 may wave, jump up and down, change size, and the like. The motion can indicate to the operator 215 that the operator 215 should look at the avatar 140 for additional information. In other words, in response to detecting the motion of the avatar 140, the focal point of the operator 215 can be the avatar 140. The positioning of the avatar 140 in the area 205 can correspond to a predetermined range of the peripheral vision of the operator 215. As a result, the motion of the avatar 140 may be more robustly detected by the operator 215 because motion may be easily detected by the operator 215 without having to place the avatar 140 in a position that may be more distracting to the operator 215 (e.g., less than 30 degrees from the first focal point 210 of the operator 215).

In S320, the avatar 140 can be enabled (e.g., via one or more predetermined avatar indication characteristics) to identify a direction of potential danger as determined by the one or more sensors 110. For example, the avatar 140 can turn its head to look in the direction of the potential danger, point, walk in the direction of the potential danger, and the like. After the avatar 140 has indicated the direction of the potential danger, the process can end.

Figure 4:
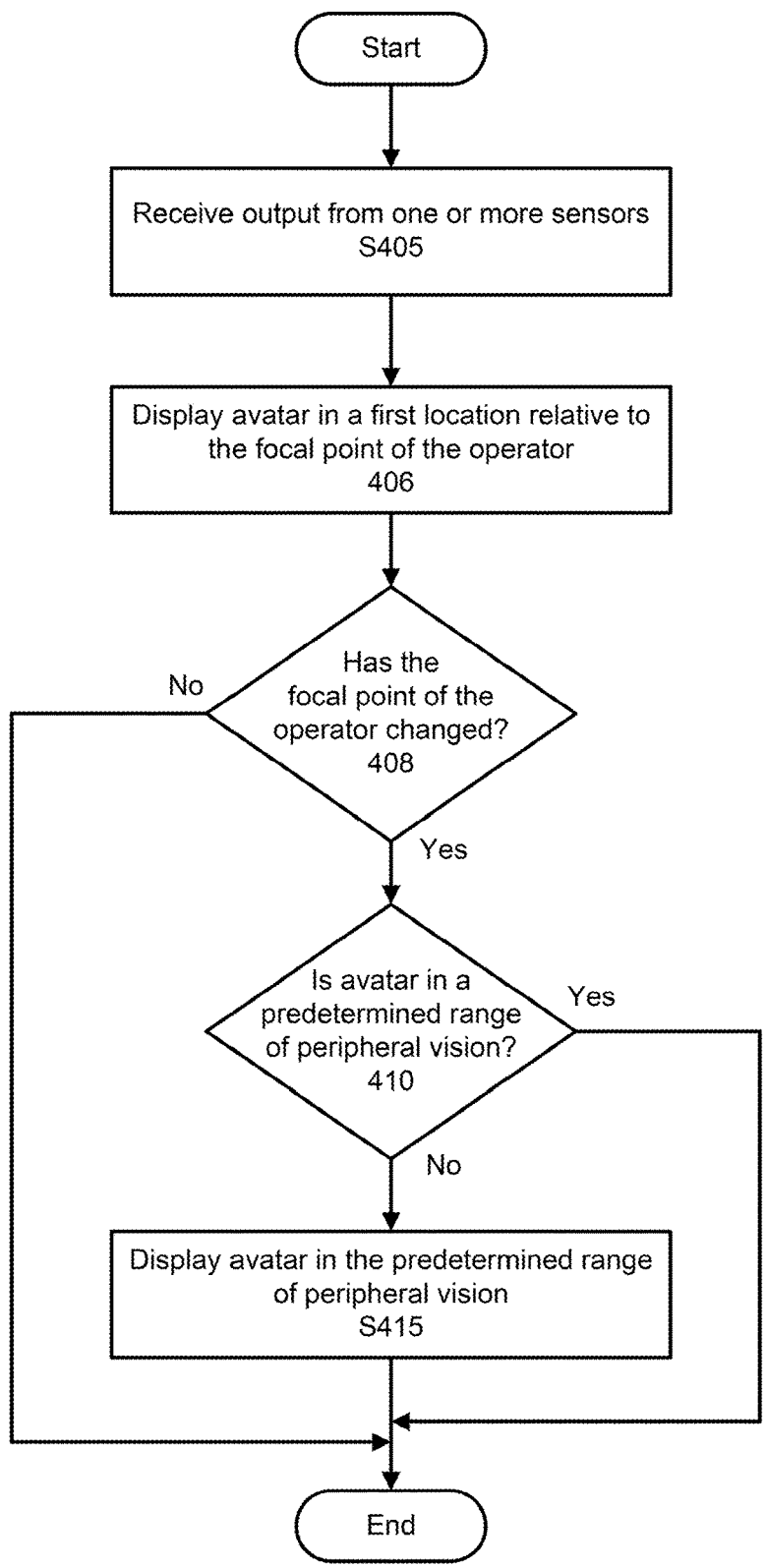
FIG. 4 is an algorithmic flow chart of a method for displaying an avatar in a predetermined range of peripheral vision of an operator according to one or more aspects of the disclosed subject matter.

FIG. 4 is an algorithmic flow chart of a method for displaying the avatar 140 in a predetermined range of peripheral vision (e.g., area 205) of the operator 215 according to one or more aspects of the disclosed subject matter.

In S405, output can be received from the one or more sensors 110. The output can correspond to information that the one or more sensors 110 capture when assisting in autonomous vehicle operation. As a result, the output from the one or more sensors 110 can be utilized for identifying any potential danger in the environment surrounding the vehicle 102.

In S406, the avatar 140 can be displayed in a first location, the first location corresponding to a predetermined range of peripheral vision of the operator of the vehicle 102 relative to a first focal point (e.g., focal point 210) of the operator of the vehicle 102.

In S408, it can be determined if a focal point of the operator has changed from the first focal point to a second focal point (e.g., focal point 210 shifting to focal point 212).

In S410, it can be determined if the avatar 140 is in the predetermined range of peripheral vision (e.g., area 205). The predetermined range of peripheral vision can be 30-60 degrees from the focal point, 60-110 degrees from the focal point, 30-110 degrees from the focal point, and the like such that the motion of the avatar 140 as described in S315 of FIG. 3 can be easily detected by the operator 215. If the avatar 140 is within the predetermined range of the peripheral vision, the process can end. However, if the avatar 140 is not within the predetermined range of the peripheral vision of the operator 215, the avatar 140 can be automatically displayed in a second location, the second location corresponding to the predetermined range of the peripheral vision of the operator 215 relative to the second focal point (e.g., focal point 212).

In S415, the avatar 140 can be displayed in the predetermined range of peripheral vision of the operator 215. In response to determining that the avatar 140 is not in the predetermined range of peripheral vision, the system 100 can automatically display the avatar in the predetermined range of peripheral vision based on the focal point of the operator 215. The focal point of the operator 215 can be determined by tracking eye movement of the operator 215. In another aspect, an imaging device (e.g., included in the one or more sensors 110) may be positioned above the head of the operator 215 providing an aerial view of the operator 215. The aerial view of the operator 215 can provide information on any rotation of the head of the operator 215, which may correspond to the focal point of the operator 215, for example. After the avatar 140 is automatically displayed in the predetermined range of peripheral vision of the operator 215, the process can end.

It should be appreciated that once the avatar 140 has the attention of the operator 215, the avatar 140 can be configured not move when the focal point of the operator 215 changes (e.g., by confirming head rotation of the operator 215 to look at the avatar 140). After the operator 215 has adjusted the focal point to be the avatar (e.g., confirmed via head rotation of the operator 215) the avatar 140 can indicate the direction of the potential danger.

Figure 5:
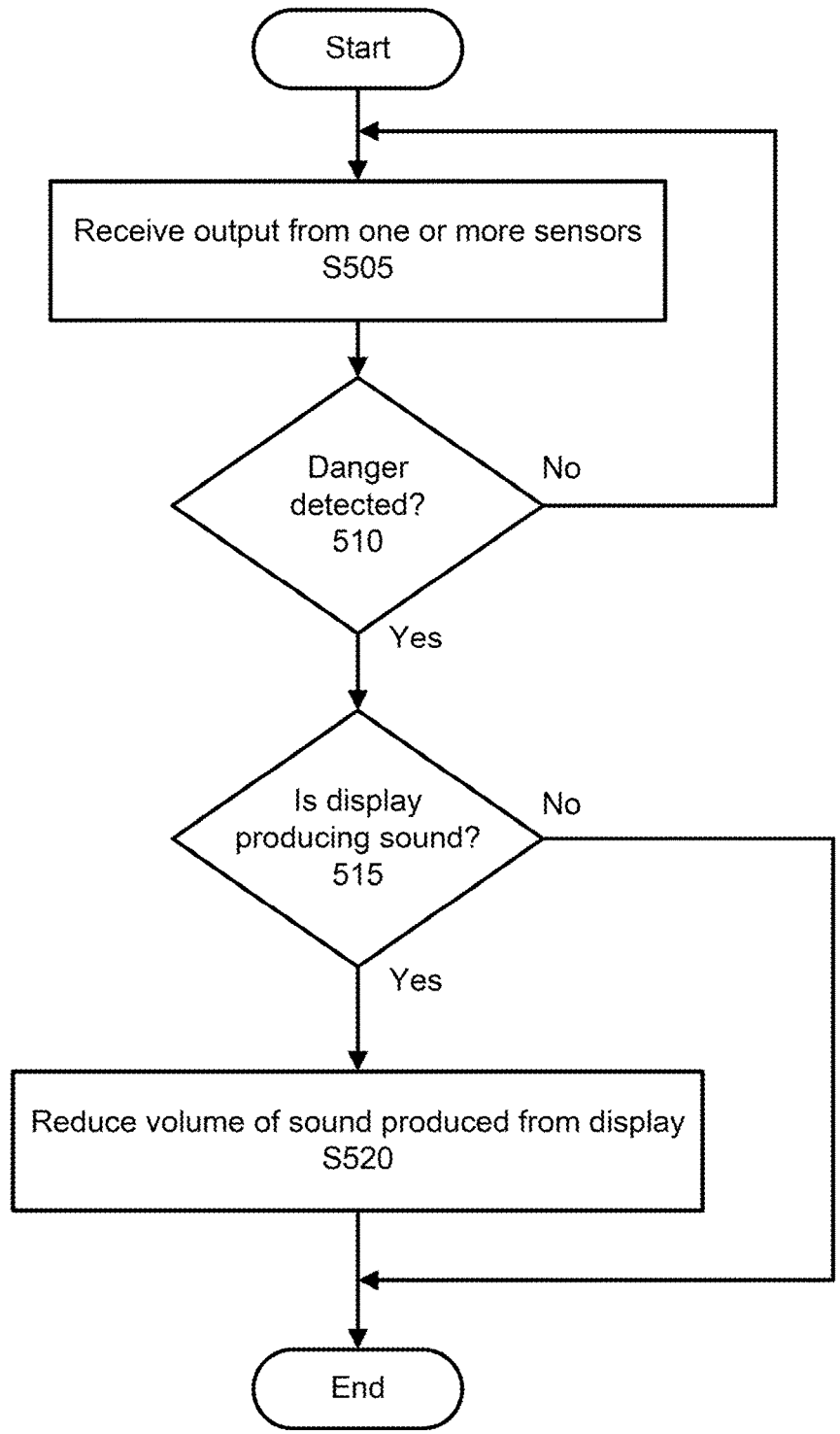
FIG. 5 is an algorithmic flow chart of a method for reducing a volume of sound produced from a display according to one or more aspects of the disclose subject matter.

FIG. 5 is an algorithmic flow chart of a method for reducing a volume of sound produced from a display (e.g., display 120, 220) according to one or more aspects of the disclose subject matter.

In S505, output can be received form the one or more sensors 110. The output can correspond to information that the one or more sensors 110 capture when assisting in autonomous vehicle operation. As a result, the output from the one or more sensors 110 can be utilized for identifying any potential danger in the environment surrounding the vehicle 102.

In S510, it can be determined if potential danger is detected via the one or more sensors 110. If no potential danger is detected, the process can return to S505 to continue receiving output from the one or more sensors 110. However, if potential danger is detected, it can be determined if the one or more displays (e.g., display 120, 220) are producing sound in S515.

In S515, it can be determined if the display 120, 220 is producing sound. If the display 120, 220 is not producing sound, the process can end. However, if the display 120, 220 is producing sound, the volume of the sound produced via the display 120, 220 can be reduced in S520.

In S520, the volume of the sound produced via the display 120, 220 can be reduced. For example, the display 120, 220 can produce sound via electrical connection to speakers. In one aspect, the volume can be reduced to zero so that no sound is produced via the display 120, 220. In another aspect, the volume can be reduced such that a current volume is less than a previous volume. In a particular example, the avatar 140 may be speaking (i.e., sound being produced via the display 120, 220) by giving directions, updates, responding to a command, etc. However, the avatar 140 speaking may be distracting to the operator 215, especially in a potentially dangerous situation. Therefore, the volume of the sound produced via the display 120, 220 can be reduced in response to any potential danger detected so the operator 215 can navigate the potential danger. Additionally, any abrupt change of volume (e.g., the avatar 140 suddenly stops speaking in the middle of a sentence) can alert the operator 215 of potential danger. As a result, the operator 215 may look at the avatar 140 in response to the avatar 140 abruptly going silent, and the avatar 140 may be indicating a direction of the potential danger for the operator 215 to focus on.

It should be appreciated that the avatars can be customizable. For example, themes and/or characters may be created and/or licensed for use in the system 100.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A parallel autonomy interface system, comprising:
one or more sensors coupled to a vehicle capable of autonomous operation;
one or more displays configured to display an avatar, the avatar including at least a head and a hand; and
processing circuitry communicably coupling the one or more sensors and the one or more displays, the processing circuitry configured to
receive output from the one or more sensors,
determine if potential danger with respect to vehicle operation is detected based on the output of the one or more sensors,
activate an alert in response to detecting the potential danger, the alert corresponding to a change in a size of the avatar, and
cause the avatar to indicate a direction of the potential danger, in response to activation of the alert, by turning the head of the avatar to face the potential danger and pointing hand of the avatar towards the potential danger.

2. The parallel autonomy interface system of claim 1, wherein the processing circuitry is configured to
display the avatar in a first location, the first location being within a predetermined area relative to a first focal point of the operator of the vehicle,
determine if the first focal point changes to a second focal point of the operator of the vehicle,
determine if the avatar is in the predetermined area relative to the first focal point in response to the first focal point changing to the second focal point, and
display the avatar in a second location in response to the avatar not being in the predetermined area relative to the second focal point, the second location being within the predetermined area relative to the second focal point.

3. The parallel autonomy interface system of claim 2, wherein the predetermined area corresponds to a predetermined range of peripheral vision of the operator of the vehicle.

4. The parallel autonomy interface system of claim 1, wherein the processing circuitry is configured to
determine if the one or more displays are producing sound, and
reduce a volume of the sound produced from the one or more displays in response to the potential danger being detected and the one or more displays producing sound.

5. The parallel autonomy interface system of claim 2, wherein the first location corresponds to a first display and the second location corresponds to a second display.

6. The parallel autonomy interface system of claim 1, wherein the avatar can be selected by the operator from a plurality of avatars.

7. The parallel autonomy interface system of claim 1, wherein the avatar further indicates the direction of the potential danger by walking in the direction of the potential danger.

8. A method of operating a parallel autonomy interface, comprising:
receiving output from one or more sensors, the one or more sensors communicably coupled to one or more displays;
determining, via processing circuitry, if potential danger with respect to vehicle operation is detected based on the output of the one or more sensors;

activating an alert in response to detecting the potential danger, the alert corresponding to a change in a size of a displayed avatar, the avatar including at least a head and a hand; and causing the avatar to indicate a direction of the potential danger, in response to activation of the alert, by turning the head of the avatar to face the potential danger and pointing the hand of the avatar towards the potential danger.

9. The method of claim 8, further comprising:

displaying the avatar, via the one or more displays, in a first location, the first location being within a predetermined area relative to a first focal point of an operator of the vehicle;

determining if the first focal point changes to a second focal point of the operator of the vehicle;

determining if the avatar is in the predetermined area relative to the first focal point in response to the first focal point changing to the second focal point; and displaying the avatar, via the one or more displays, in a second location in response to the avatar not being in the predetermined area relative to the second focal point, the second location being within the predetermined area relative to the second focal point.

10. The method of claim 9, wherein the predetermined area corresponds to a predetermined range of peripheral vision of the operator of the vehicle.

11. The method of claim 8, further comprising:

determining if the one or more displays are producing sound; and reducing a volume of the sound produced from the one or more displays in response to the potential danger being detected and the one or more displays producing sound.

12. The method of claim 9, wherein the first location corresponds to a first display and the second location corresponds to a second display.

13. The method of claim 8, wherein the avatar can be selected by an operator of the vehicle from a plurality of avatars.

14. The method of claim 8, wherein the avatar further indicates the direction of the potential danger by walking in the direction of the potential danger.

15. A non-transitory computer-readable storage medium storing computer-readable instructions that, when executed by a computer, cause the computer to perform a method of operating a parallel autonomy interface, comprising:

receiving output from one or more sensors, the one or more sensors communicably coupled to one or more displays;

determining if potential danger with respect to vehicle operation is detected based on the output of the one or more sensors;

activating an alert in response to detecting the potential danger, the alert corresponding to a change in a size of a displayed avatar, the avatar including at least a head and a hand; and causing the avatar to indicate a direction of the potential danger, in response to activation of the alert, by turning the head of the avatar to face the potential danger and pointing the hand of the avatar towards the potential danger.

16. The method of claim 15, further comprising:

displaying the avatar, via the one or more displays, in a first location, the first location being within a predetermined area relative to a first focal point of an operator of the vehicle;

determining if the first focal point changes to a second focal point of the operator of the vehicle;

determining if the avatar is in the predetermined area relative to the first focal point in response to the first focal point changing to the second focal point; and displaying the avatar, via the one or more displays, in a second location in response to the avatar not being in the predetermined area relative to the second focal point, the second location being within the predetermined area relative to the second focal point.

17. The method of claim 15, further comprising:

determining if the one or more displays are producing sound; and reducing a volume of the sound produced from the one or more displays in response to the potential danger being detected and the one or more displays producing sound.

* * * * *